(12) United States Patent
Elisseeff

(10) Patent No.: US 12,153,711 B1
(45) Date of Patent: Nov. 26, 2024

(54) SYSTEMS AND METHODS FOR PREDICTIVE ANALYSIS

(71) Applicant: Go2Market Insights, LLC, Denver, CO (US)

(72) Inventor: Pierre Elisseeff, Cincinnati, OH (US)

(73) Assignee: Go2Market Insights, Inc., Centennial, CO (US)

( * ) Notice: Subject to any disclaimer, the term of this patent is extended or adjusted under 35 U.S.C. 154(b) by 225 days.

(21) Appl. No.: 17/822,044

(22) Filed: Aug. 24, 2022

Related U.S. Application Data

(60) Provisional application No. 63/341,031, filed on May 12, 2022, provisional application No. 63/288,772, filed on Dec. 13, 2021, provisional application No. 63/255,637, filed on Oct. 14, 2021, provisional application No. 63/236,369, filed on Aug. 24, 2021.

(51) Int. Cl.
*G06F 21/62* (2013.01)

(52) U.S. Cl.
CPC .. *G06F 21/6245* (2013.01); *G06F 2221/2115* (2013.01)

(58) Field of Classification Search
CPC .............. G06F 21/6245; G06F 2221/2115
See application file for complete search history.

(56) References Cited

U.S. PATENT DOCUMENTS

| | | |
|---|---|---|
| 2004/0054638 A1 | 3/2004 | Agami |
| 2005/0096950 A1 | 5/2005 | Caplan et al. |
| 2016/0117593 A1 | 4/2016 | London |
| 2016/0196587 A1 | 7/2016 | Eder |
| 2017/0235848 A1 | 8/2017 | Van Dusen |
| 2017/0244735 A1 | 8/2017 | Visbal et al. |
| 2019/0095507 A1 | 3/2019 | Elisseeff et al. |
| 2020/0250231 A1 | 8/2020 | Seigel et al. |
| 2021/0152327 A1* | 5/2021 | Givental ............... H04L 9/0618 |

FOREIGN PATENT DOCUMENTS

| | | |
|---|---|---|
| WO | 2019060912 A1 | 3/2019 |
| WO | 2020214636 A1 | 10/2020 |

OTHER PUBLICATIONS

Democratize AI. https://h2o.ai/. Accessed Dec. 28, 2022. 10 pages.
DataRobot. https://www.datarobot.com/. Accessed Dec. 28, 2022. 12 pages.
Madkudu. https://www.madkudu.com/. Accessed Dec. 28, 2022. 12 pages.
International Search Report of PCT application serial No. PCT/US2018/052728. Dec. 2018. 2 Pages.
Written Opinion of PCT application serial No. PCT/US2018/052728. Dec. 2018. 7 Pages.
International Search Report of PCT application serial No. PCT/US2020/028201. Oct. 2020. 2 Pages.
Written Opinion of PCT application serial No. PCT/US2020/028201. Oct. 2020. 4 Pages.

* cited by examiner

*Primary Examiner* — Izunna Okeke
(74) *Attorney, Agent, or Firm* — FisherBroyles LLP; Ian R. Walsworth

(57) ABSTRACT

The present disclosure relates to systems for enhancing security of communications occurring over a network, including methods for encrypting and decrypting communications of data over the network. The following also discloses systems for conducting analysis on a system of record, such as a Customer Relationship Management platform, including propensity scoring and modeling. Components and interfaces of the system are also disclosed herein.

13 Claims, 17 Drawing Sheets

800 Raw Data Prior to Encoding

| Field Name 802 | Field Type 803 | Field Value 804 |
|---|---|---|
| LocationID | Categorical | 48 |
| City | Categorical | Urbi |
| State | Categorical | TX |
| Postal_Code | Categorical | 75063 |
| Latitude | Numerical | 31.93823 |
| Longitude | Numerical | -94.94716 |
| Precision | Categorical | Zip9 |
| FIPS | Categorical | 48113 |
| Name | Categorical | ACME CORP |
| Sq_Ft | Numerical | 98093 |
| Type | Categorical | OFFICE |
| Class | Categorical | B |
| Star_Rating | Numerical | 3 |
| Year_Built | Numerical | 1997 |
| Elevators | Numerical | 0 |
| Rent_Per_Sqft_Yr | Categorical | NOT DISCLOSED |
| Vacancy_Pct | Numerical | 0 |
| Submarket_Name | Categorical | SPRINGFIELD |
| Submarket_Cluster | Categorical | MEGAVILLE |

810 Encoded Data

| Field Name 812 | Field Type | Field Value 814 |
|---|---|---|
| X_0 | Categorical | 799b67c4-e951-49a2-a42d-d62942480a2e |
| X_1 | Categorical | 5110b515-38cf-4b1e-8824-0011d83ea069 |
| X_2 | Categorical | 574fb934-5f18-4468-a092-15d3d336aac4 |
| X_3 | Categorical | 7542bede-7ca8-4101-ae44-4397260b13d5 |
| X_4 | Numerical | 0.5300 |
| X_5 | Numerical | 0.0572 |
| X_6 | Categorical | 13550f58f-2123-46fa-9873-2bf9ca2758a9 |
| X_7 | Categorical | 6716c501-1729-4316-bd51-8854cc98e721 |
| X_8 | Categorical | bd62b3fa-e6e7-4baf-bd40-704b21558227 |
| X_9 | Numerical | 0.2959 |
| X_10 | Categorical | efd52120-25b3-45fa-a4be-da4feccacfa1 |
| X_11 | Categorical | 9003bd8e-6499-40ab-af68-64702ae38e8c |
| X_12 | Numerical | 0.5071 |
| X_13 | Numerical | 0.1734 |
| X_14 | Numerical | (0.1244) |
| X_15 | Categorical | dd4a3d07-b857-4262-9cb9-e9545fbba297 |
| X_16 | Numerical | (0.3185) |
| X_17 | Categorical | 33ec9ed4-8ce4-4ef7-a032-06103ec03d2a |
| X_18 | Categorical | 8b7c1ca8-d796-4f06-abe3-e62771c534e7 |

FIG. 16

SYSTEMS AND METHODS FOR PREDICTIVE ANALYSIS

CROSS-REFERENCE TO RELATED APPLICATIONS

This application claims priority to and the benefit under 35 U.S.C. § 119(e) to U.S. Provisional Patent Application Serial Nos. 63/236,369, filed on Aug. 24, 2021, 63/255,637, filed on Oct. 14, 2021, 63/288,772, filed on Dec. 13, 2021, and 63/341,031, filed on May 12, 2022. The entireties of the foregoing applications are incorporated by reference herein.

FIELD OF THE INVENTION

This disclosure is generally directed toward systems and methods for analyzing and/or predicting one of a variety of business, sales or marketing-related metrics. The disclosure also relates to enhanced transmission of sensitive data and collaboration among users of said data.

COPYRIGHT NOTICE

A portion of this disclosure is subject to copyright protection. Limited permission is granted to facsimile reproduction of the patent document or patent disclosure as it appears in the U.S. Patent and Trademark Office (USPTO) patent file or records. The copyright owner reserves all other copyright rights whatsoever.

BACKGROUND OF THE INVENTION

Business and finance-related systems contain information in a variety of different manners, and increasingly contain a quantity of data that makes it difficult, if not impossible, for an individual (or multiple individuals) to quickly retrieve and analyze, or for that matter provide predictive analysis. Such information may be derived from a source document or from several sources of data, updated on a daily, weekly or monthly basis, and in some instances may be updated constantly or involve streaming data. This information may be organized according to one or more formats or systems, further complicating the retrieval and analysis of such information.

Large data sets concerning financial and/or business intelligence are increasingly being reviewed and modified, often by numerous individuals across multiple divisions, departments and organizations, causing further difficulties. Current business analytical approaches are often highly customized for the data source and structure being analyzed. Accordingly, current analysts treat these data sets as largely immutable, and therefore adapt a broad variety of analytical techniques to suit the business task at hand. This creates discrepancies between one analytical approach and another, which in turn can create discrepancies when attempting to merge the analysis performed by one analyst with another, particularly where the analysts have different respective objectives.

Current state of the art business intelligence systems provide structured or sorted data to users, but such systems have limited or no ability to perform many analytical tasks. At most, such systems comprise stand-alone capabilities typically used for scoring (lead scoring, retention scoring, credit scoring, etc.) or broad pattern recognition (network breach detection, network security analysis). These systems are complex, reactive, and require significantly more resources to operate. Further, these systems are hard to scale, particularly when overwhelmed with data.

Certain applications exist that can provide assistance with general tasks, such as navigating through complex data repositories. However, such applications are generally limited in the number of commands and queries those applications are able to process. Prior art applications also require significant training (are non-intuitive) and/or fail to provide meaningful analysis and processing of data in the manner equivalent to a business or financial analyst. Further, there are a number of shortcomings in the art with respect to a user's ability to access and analyze such information quickly and efficiently, so that information necessary to make business or financial-related decisions is possible in near-real or real time.

Enterprises frequently collect data from consumers and other users of enterprise communication systems, including data obtained from Internet-enabled communications. This data includes personal data or Personal Identifying Information (PII), which is often at risk of loss and potential exploitation. As a result of recent breaches of enterprise data protection schemes, consumers have low confidence in sharing data with various enterprises. In turn, the enterprises impacted by the breach or risk of breach have incurred great expense in an attempt to address these concerns.

One particular problem experienced by those of ordinary skill in the art is managing PII in a traditional client-server hierarchy or system. These types of traditional systems typically do not restrict sensitive information from being used, which in turn permits other users to ingest PII and other sensitive data, which then in tun may be easily misused. Certain traditional systems may employ NLP techniques to detect PII, but this technique is impractical for the volume of data consumed, the technique is not always 100% correct, and there are no fail safes or backup techniques if the NLP technique is ineffective.

Furthermore, when PII or other sensitive data is involved, traditional architectures typically involve "closed" server-client systems, whereby no sensitive information is supposed to cross the security boundary set around the client and the server. However, in current cloud-based systems, the security boundary is much harder to define and enforce because of the number of third party systems touching or crossing that boundary, such as third party systems accessible from public Internet; hence, the need for "zero-trust protocols" when the server security or the means of transmission cannot be trusted.

Even when sensitive data is effectively encoded, malicious parties can still hack into the server and quickly locate and decode the sensitive information by pretending to be a legitimate user. Most if not all of the processing and encoding (other than standard TLS/SSL encoding) is generally done on the server side, which means the TLS/SSL layer is the only means of protecting PII or other sensitive information on the client side, which is useless if compromised (e.g. through malicious impersonation).

It would therefore be beneficial to provide a system and/or method for analyzing and/or predicting one of a variety of business, sales or marketing-related metrics that overcomes these shortcomings and other problems presently faced by those of skill in the pertinent art, including a system that permits transmission of sensitive, personal data without impacting any other functions to support compliance requirements such as GDPR and other data privacy regulations.

SUMMARY OF THE INVENTION

The present disclosure relates to systems and methods that overcome the problems identified above. While several advantages of the system and method of one embodiment are described, this Summary is neither intended nor should it be construed as being representative of the full extent and scope of the present invention.

The present invention is set forth in various levels of detail in the Summary, in the Detailed Description, in the drawing figures included and that make up a part of the specification, and in related U.S. Provisional Patent Application Nos. 63/236,369, 63/255,637, 63/288,772 and 63/341,031, which are incorporated by reference herein in their entireties. No limitation as to the scope of this disclosure is intended by either the inclusion or non-inclusion of elements, components, etc. in the Summary. Additional aspects of the present disclosure will become more readily apparent from review of the Detailed Description and appended claims.

In one aspect, the present disclosure provides a novel and effective method of providing client-side encoding of information/data received by the system. The method of "client-side encoding" (i.e., the manner in which the system handles data, stripping PII and other sensitive information received with that data) preferably occurs exclusively on the software client—not on the server side—as elaborated below. In most systems, the stripping of information is done outside the system prior to using the system, and/or is done on the server side, as illustrated in the Background section above.

The client-side encoding of data solves the problems experienced by those familiar with the prior art in multiple ways. In one aspect, the disclosure includes methods for systematically encoding all categorical and numerical variables on the client side, wherein the system consistently strips 100% of the sensitive information regardless of user input. By storing encoding/decoding keys on the client side, PII and other sensitive data is never transmitted to or stored on the server side. The PII and other sensitive data only resides on the user's machine (i.e., the software client) and may be encrypted locally at rest. In this manner, PII may not be stolen through remote impersonation or hacking into the server. In this embodiment, the only way to maliciously acquire the keys is by taking control of the individual's specific physical machine. The sensitive information may stay there, within a more readily defined and specific security boundary, and thereby be restricted from crossing the security boundary when interfacing with other third-party systems. In this embodiment, other aspects of the system and method disclosed herein may be utilized, such as performing or sharing analytics, without ever transmitting sensitive data.

In another aspect, the system permits a user or administrative user to compel the use of the client-side encoding method, thereby instituting an enhanced security mode to lock down all PII use. In this embodiment, no PII or other sensitive data is transmitted.

In yet another aspect, the present disclosure includes a propensity scoring system that is modular, flexible, and not dependent on the use of ad hoc or specific third-party services, and which otherwise more easily integrates in the back-end of enterprise systems. In one embodiment, the system comprises one or more of: (a) a Customer Relationship Management (CRM) system; (b) a third party data source; (c) a data warehouse; (d) an Analyzr API; (e) a forward ETL service (preferably coupled with a cloud service); and (f) a reverse ETL service. Other components may be provided via an Application back-end, front-end or analytics engine as depicted in FIGS. 1-5 and described in the Detailed Description below.

In embodiments described herein, these components (a)-(f) may be controlled by different parties and/or entities and secured separately in a "zero-trust" environment. Components (e) and (f) preferably orchestrate the movement of information between all the systems such that required data elements be processed and returned to the system of record, such as the CRM, in due time.

In another aspect, the system and method comprise one or more novel user interfaces provided to facilitate a user's construction and operation of a machine learning model, as well as perform analytical operations using that model to, by way of example but not limitation, perform propensity modeling.

It is to be expressly understood that this Summary provides embodiments only, and is not intended to limit the scope, applicability, or configuration of the invention. Rather, this summary will provide those skilled in the art with an enabling description for implementing the embodiments. It should be understood that various changes may be made in the function and arrangement of elements without departing from the spirit and scope of the appended claims.

Furthermore, while embodiments of the present disclosure will be described in connection with various examples of data, datasets and/or PII, it should be appreciated that embodiments of the present disclosure are not limited to any particular class or type of data. In addition, while embodiments of the present invention may be described in connection with a particular server-based system architecture, other systems are expressly contemplated.

Several terms used herein are intended to be understood according to their plain and ordinary meaning. Other terms are specifically defined in the Detailed Description section below.

While the invention is described in terms of exemplary embodiments, it should be appreciated that individual aspects of the invention may be separately claimed.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures. Applicant hereby expressly incorporates the figures in Appendix A from Applicant's co-pending U.S. Provisional Patent Application No. 63/341, 031, filed on May 12, 2022, for the purpose of supplementing the written description requirements of 35 U.S.C. § 112.

In certain instances, details that are not necessary for an understanding of the disclosure or that render other details difficult to perceive may have been omitted. It should be understood, of course, that the disclosure is not necessarily limited to the particular embodiments illustrated in the following Figures. In the drawings:

FIG. 16 further illustrates the method of encoding and decoding data according to the embodiment of FIG. 15.

DETAILED DESCRIPTION

Figure 1:
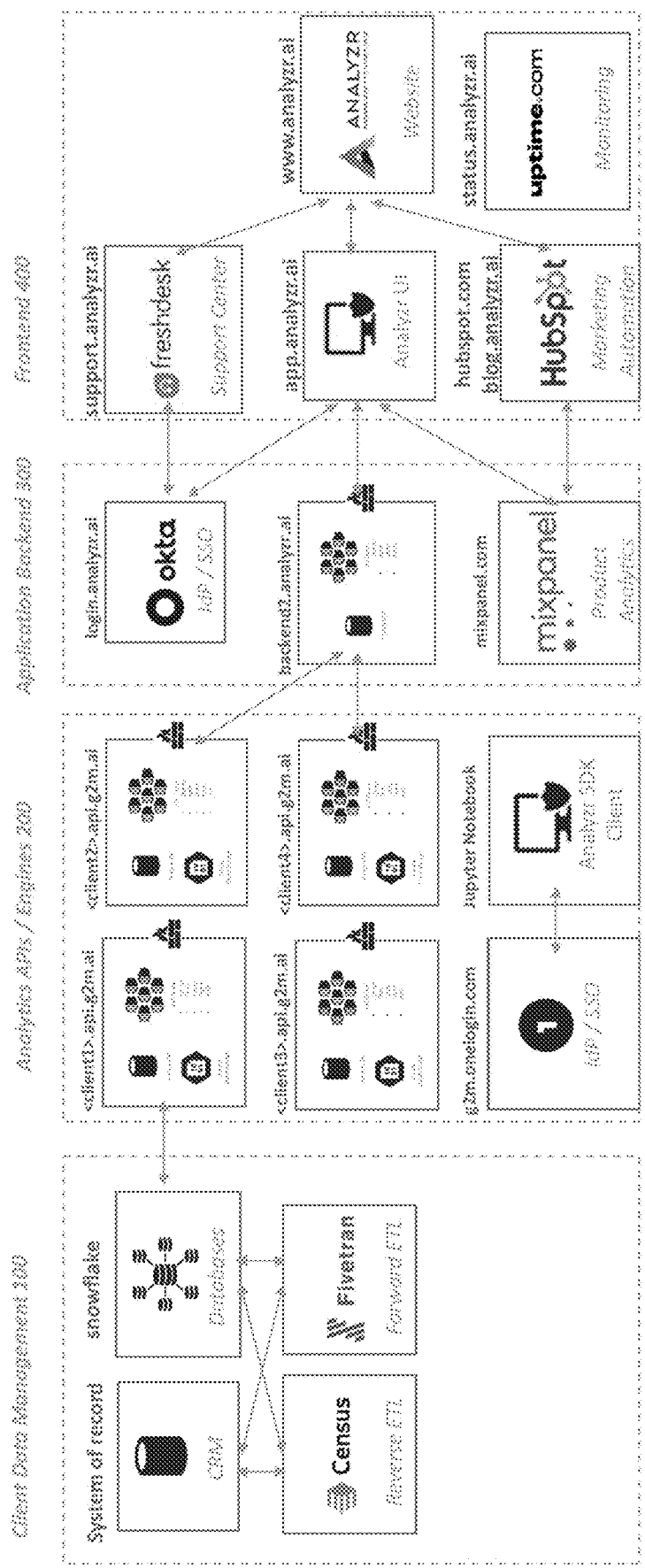
FIG. 1 illustrates various components of the system and method in a particular embodiment.

The following disclosure is directed to various embodiments, including those depicted in FIGS. 1-17 appended hereto. Although one or more of these embodiments may be preferred, the embodiments disclosed should not be interpreted, or otherwise used, as limiting the scope of the disclosure, including the claims. In addition, one skilled in the art will understand that the following description has broad application, and the disclosure of any embodiment is meant only to be exemplary of that embodiment, and not intended to intimate that the scope of the disclosure, including the claims, is limited to that embodiment.

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

Certain terms are used throughout the following description and claims to refer to particular system components. As one skilled in the art will appreciate, companies may refer to a component by different names. This document does not intend to distinguish between components that differ in name but not function.

In the following disclosure, the terms "including" and "comprising" are used in an open-ended fashion, and thus should be interpreted to mean "including, but not limited to . . . ." Also, the term "couple" or "couples" is intended to mean either an indirect or direct connection. When used in a mechanical context, if a first component couples or is coupled to a second component, the connection between the components may be through a direct engagement of the two components, or through an indirect connection that is accomplished via other intermediate components, devices and/or connections. In addition, when used in an electrical context, if a first device couples to a second device, that connection may be through a direct electrical connection, or through an indirect electrical connection via other devices and connections. Connections can occur in a unidirectional, bidirectional or variable directional manner over all known means of network connectivity.

As used herein, the term "user" refers to a uniquely identifiable construct within a system that is able to perform an action within the system. This action is not limited in scope and can include such things as create, read, update, delete (CRUD) options, transport, transformation, communications and so forth. For example, a "user" is not limited to a human being, but also includes processes, services, and other such subsystems and code that can be assigned unique identifiers. Thus, a user differs from a unique option such as a row identifier in a database table, which is unable to take any action on the system. In some instances, a user refers to a logical construct such as a user of a virtual machine running within the context of a physical device. In this instance, the virtual user is a version of the user mapping of the application hosting the virtual machine.

As used herein, the general term "device" refers to either a physical device (or group of physical devices) or a virtual machine or device. A physical device generally refers to the physical and software resources required to run an operating system and supporting software. A virtual machine generally refers to an emulation of a computer system, which may be carried out by a physical device or a collection of physical devices acting towards one logical purpose. Grid computing and clustered servers are examples of multiple devices working towards one logical purpose.

As used herein, the terms "user device" and "active user device" refer to the logical intersection of a device and a user. Users and devices may have a many-to-many relationship and thus multiple user devices may exist within a given device or for a given user at any one time.

As used herein, the term "platform" refers to a grouping of similar devices. Devices may be grouped based on the type of operating system used, the type of device itself (e.g., secured/unsecure; desktop/laptop/mobile; client/server; peer/super peer; or old/new), or another distinction that identifies devices in a given system either by its presence and variability among devices or by it lack of presence in some subset of devices. Thus, as used herein, the term "cross-platform" as in "cross-platform communication" refers to devices of two different platforms that communicate with one another; such a cross-platform system may be referred to as a hybrid system.

The term "machine-readable media" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a flexible disk, hard disk, magnetic tape, or any other magnetic medium, magneto-optical medium, a CD-ROM, any other optical medium, a RAM, a PROM, an EPROM, a FLASH-EPROM, a solid-state medium like a memory card, any other memory chip or cartridge, or any other medium from which a computer or like machine can read. When the computer-readable media may be configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

Finally, as used herein, the term "operation" or "performing an operation" refers to a packet-modifying operation such as encrypting the packet, replacing the packet with an alternate packet, deleting the packet, cloning the packet, replacing the packet with a packet pointer, and the like. Performing an operation on a packet may be restricted to a base datagram and may exclude to the modification of header fields.

Referring now to FIGS. 1-5, an overview of various components and devices is shown with coupling where one or more components or devices are integrated with one another. The system generally consists of a client data management subsystem 100, an analytics API subsystem 200, an application backend 300 and an application frontend 400, each comprising one or more modules, devices and/or processes associated therewith. As opposed to prior art propensity modeling systems, which are either native (i.e., developed by data owners using ad hoc techniques specific to their enterprise and/or data), or are offered through a combination of vendor-specific software that many times requires custom code to integrate with their platform, the current system is both modular and flexible, and permits a user to easily integrate the necessary components into the system of choice. In preferred embodiments, the system is comprised of at least a CRM or equivalent system 110, one or more third-party data sources 120, a data warehouse 125, an Analyzr API or engine 200, a forward ETL service 130, preferably coupled with a cloud service, and a reverse ETL service 140. These and other components/devices may be controlled by different parties and/or entities and secured separately in a zero-trust environment.

Additional components are shown in FIG. 1-5 and may be coupled with one or more components as illustrated in FIG. 1. More specifically, components of the Client Data Management subsystem 100 may be coupled and in communication with each other while also being coupled to the analytics API subsystem 200. Although shown in FIG. 1 as coupled to <client1>api.g2 m.ai module, the Client Data Management subsystem 100 may be coupled to other clients and/or modules. In preferred embodiments, one or more modules of the analytics API subsystem 200 may be coupled to the application backend 300, including via a backend2.analyzer.ai module. Further communications may occur on the analytics API subsystem 200, including between the IdP/SSO module 250 and Analyzer SDK Client module 260.

Figure 3:
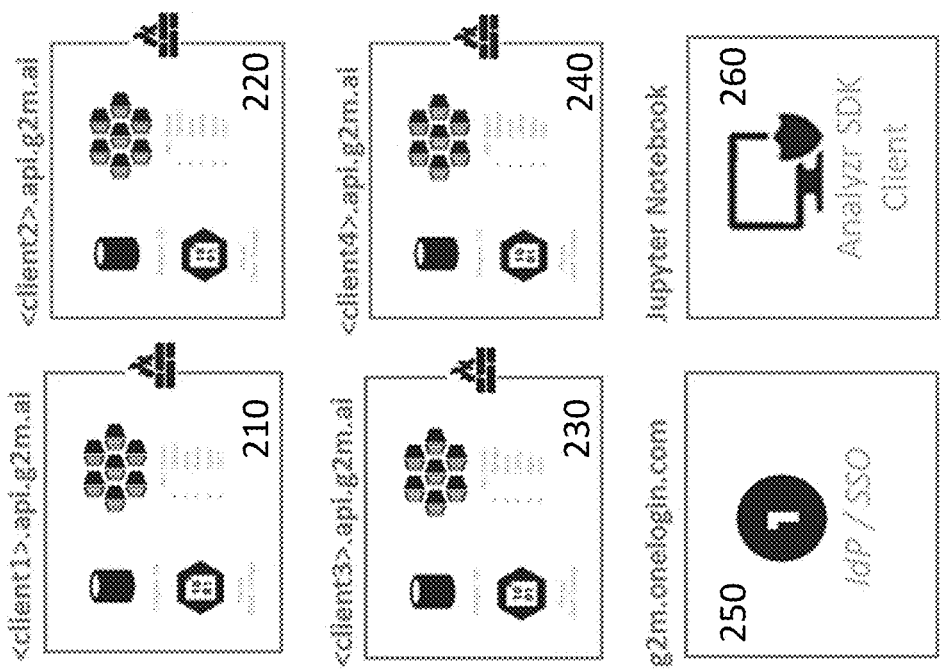
FIG. 3 illustrates analytical interfaces and machine learning components corresponding to the embodiment of FIG. 1.
Figure 4:
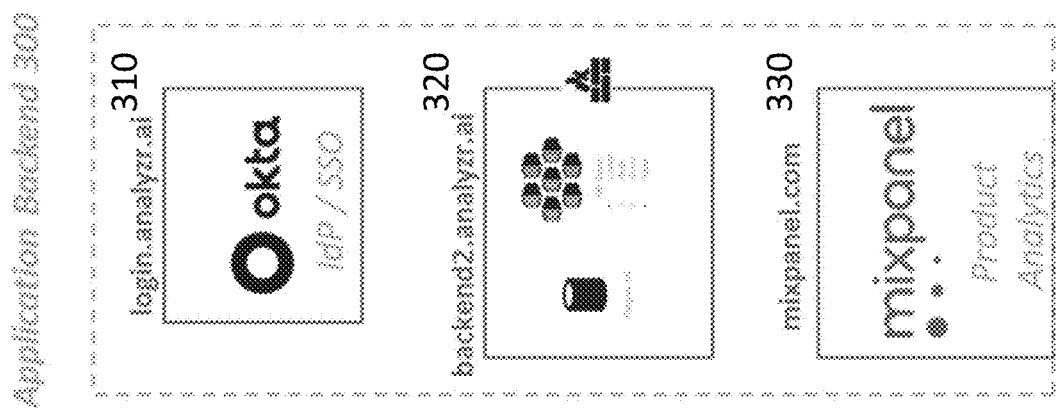
FIG. 4 illustrates the Analyzer modules and system back-end components corresponding to the embodiment of FIG. 1.
Figure 5:
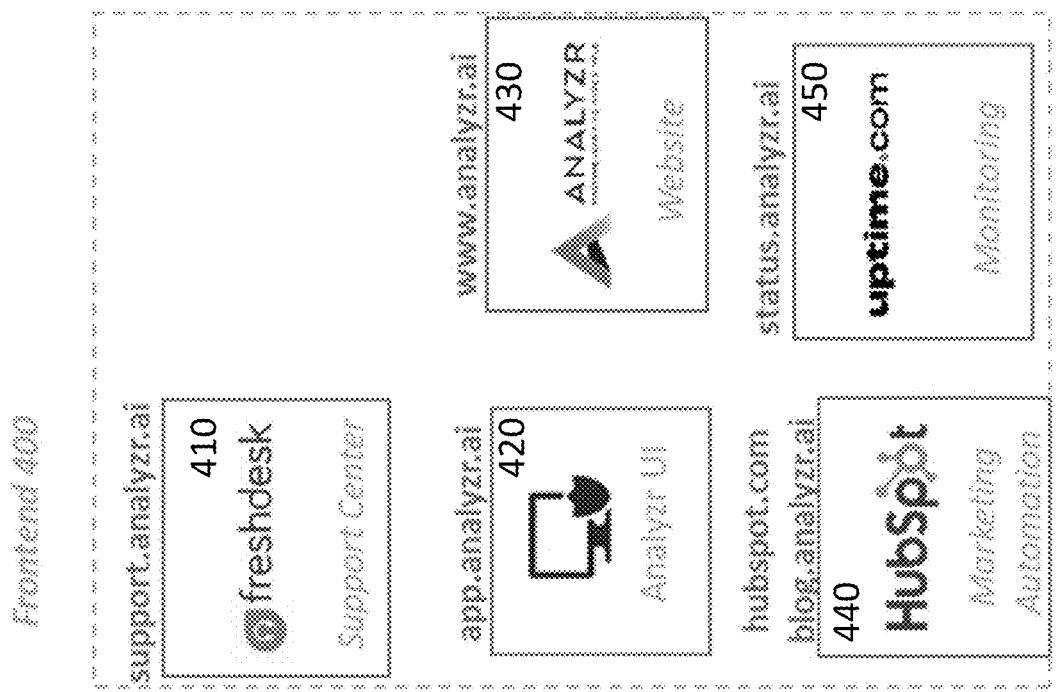
FIG. 5 illustrates system front-end components corresponding to the embodiment of FIG. 1.

The system may also be comprised of one or more additional components, such as backend Analyzer functions 320 and product analytics 330, as illustrated in FIGS. 3-4 and described in greater detail below. One or more of these components may be coupled to and in communication with the application frontend 400, which preferably comprises a support center module 410, user interface module 420, website or equivalent portal 430, marketing automation module 440 and monitoring module 450 as illustrated in FIGS. 1 and 5.

The forward ETL service 130 and reverse ETL service 140 are preferably configured to orchestrate the movement of information between all components/devices such that the data elements that require processing/computing are timely processed and returned to the system of record (such as the CRM).

Figure 2:
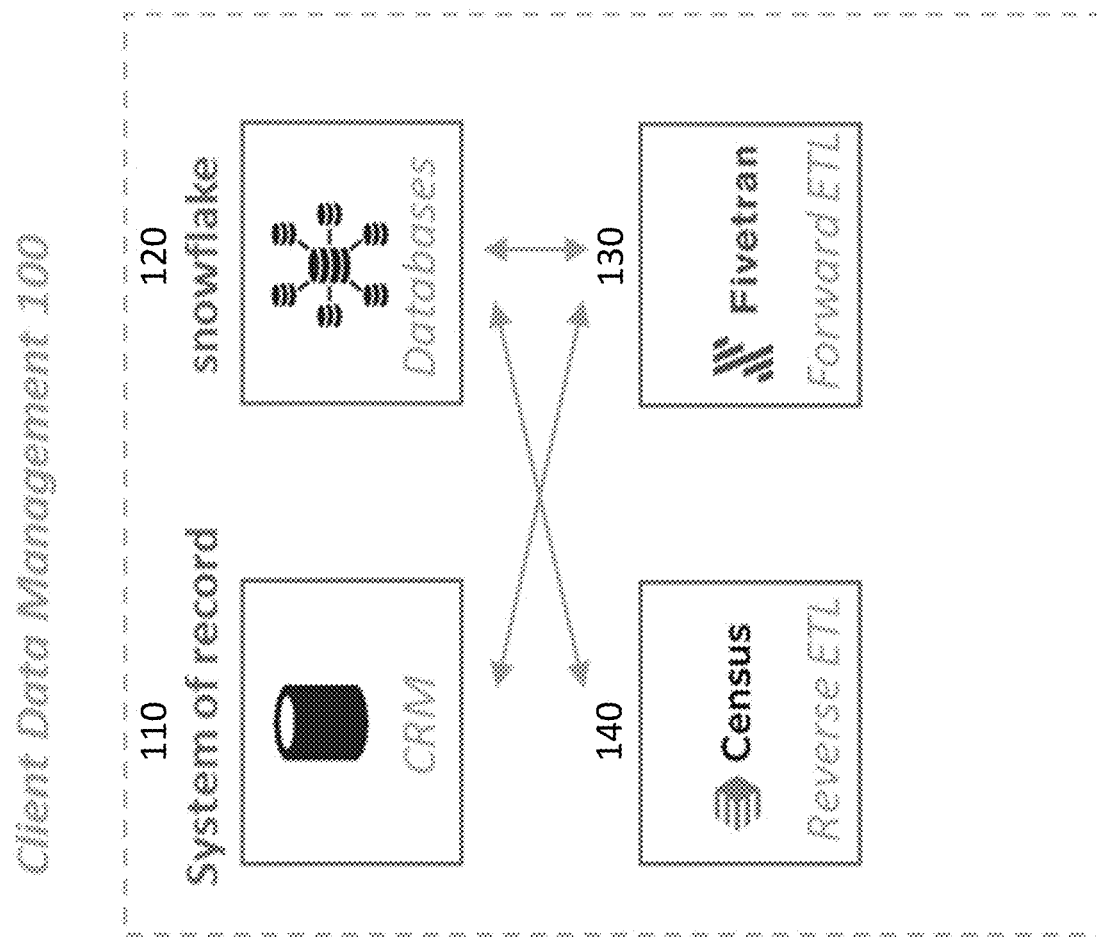
FIG. 2 illustrates client data management components corresponding to the embodiment of FIG. 1.

In preferred embodiments, the system is comprised of a machine learning component that is referred to herein as the "Analyzer" engine 200. Referring now to FIG. 2, additional aspects of the components of the data management system 100 emerge. The databases 120 from which data is analyzed is accessible from both the forward ETL service 130, which in a preferred embodiment may consist of Fivetran or an equivalent ETL, and the reverse ETL service 140, which in a preferred embodiment may consist of Census or an equivalent ETL. The system of record or CRM 110 may be coupled to the forward ETL service 130 and thereby access a number of third-party data sources 120 via, by way of example, Snowflake or an equivalent data cloud service.

The data may be arranged in a number of different formats without impacting the use of the system or methods described herein. For example, the database structure may be in a spreadsheet format, csv file format, Hadoop format or other format and data extracted as needed by the client data management system 100.

Turning to FIG. 3, the system may be comprised of analytical interfaces and machine learning modules 210, 220, 230, 240. These modules may comprise a database component, cloud storage component and AKS cluster. The AKS cluster may be comprised of one or more subcomponents, such as Django, Redis, Celery, Nginx, H2O or other software applications. The modules may be isolated by one or more firewalls 550. The Analyzer APIs 200 may further comprise an IdP/SSO module 250 and SDK Client module 260 as shown in FIG. 4.

FIG. 4 illustrates aspects of the Analyzer module and connectivity to various system back-end components/devices 300. For example, the system may comprise a backend IdP/SSO module 310, which in a preferred embodiment is provided by Okta. The backend 300 may further comprise a backend Analyzer module 320, which may be comprised of at least one database and an AXS cluster of Django, Redis, Celery and Nginx subcomponents, by way of example. The backend may be insulated by a firewall 550 and prevent unintended or malicious extraction of data from the frontend subsystem 400, which is described in relation to FIG. 5.

FIG. 5 illustrates front-end components of the system in a preferred embodiment. The Frontend 400 preferably consists of a support center module 410, a user interface 420 for accessing and manipulating the Analyzer engine 200, a website portal 430, a marketing automation module 440 and a runtime monitoring module 450. Other applications, modules and/or devices are contemplated in addition to the ones illustrated in FIG. 5.

Figure 6:
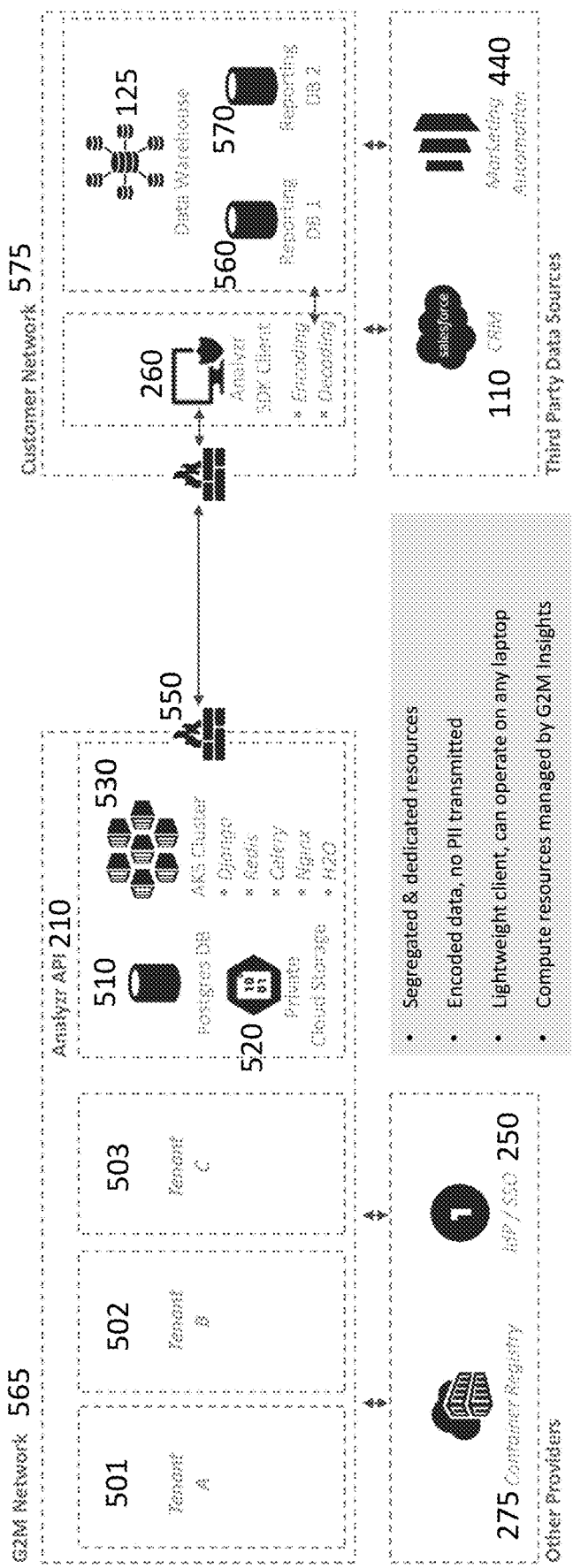
FIG. 6 illustrates a network architecture according to a particular embodiment.

Turning now to FIG. 6, the aspects of the system described above may be coupled via one or more network connections. In this embodiment, one or more clients or tenants 610 may access the Analyzer engine 200 over a private network 620. Other providers 630, 640 may be coupled to the system on a separate network, thereby segregating those provides 630, 640 from the private network 620. In this manner, the Analyzer engine 200 is dedicated to the client and accessible despite loss of network communications with third party systems. As described in greater detail below, the data processed by the Analyzer engine 200 is encoded and decoded on the client side of this segregated network, which in turn ensures that no PII or other sensitive data is transmitted. The customer network 650 may be accessed by the client through a firewall-protected coupling 550, with SDK client module 260, data warehouse and reporting databases preferably residing on the customer network. Once again, no PII or sensitive data is transmitted from the Analyzer engine 200 to the customer network 650, thereby preventing the loss of such data via transmission to the CRM 110 or marketing automation module 440. Other third-party data sources may be similarly connected via a separate network connection, thereby maintaining the segregation explained above.

Figure 7:
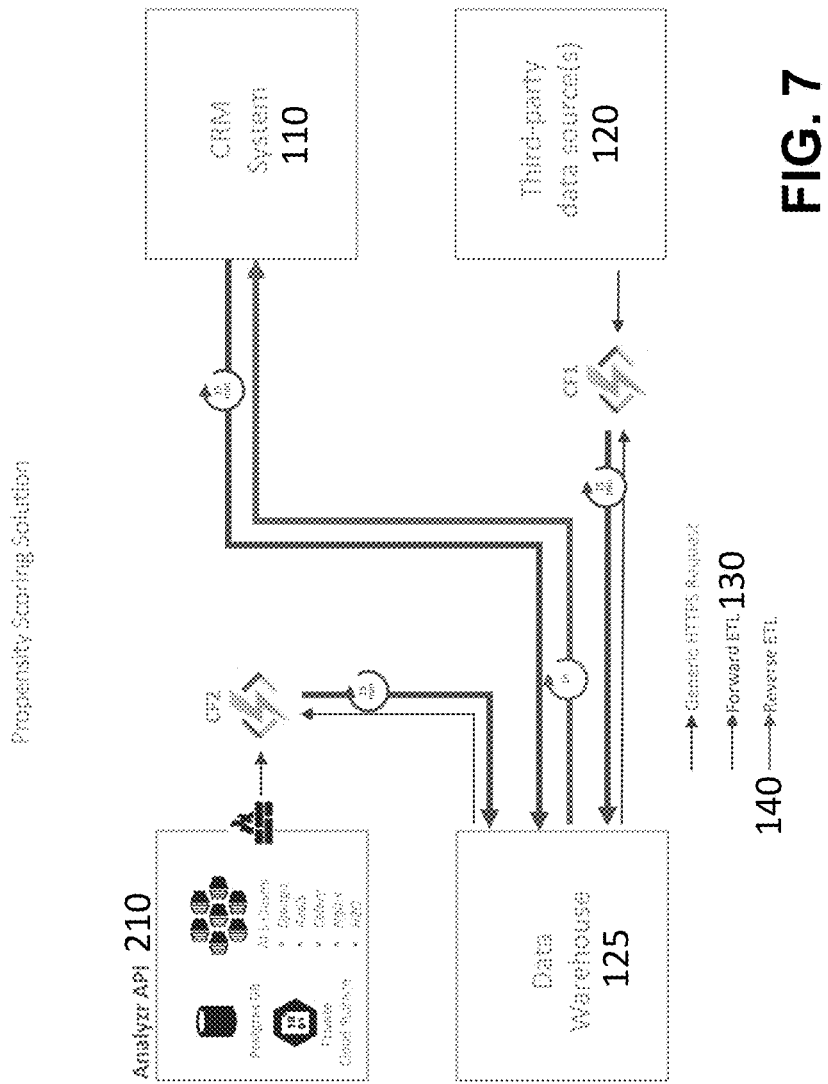
FIG. 7 illustrates a method for performing propensity scoring according to a particular embodiment.
Figure 8:
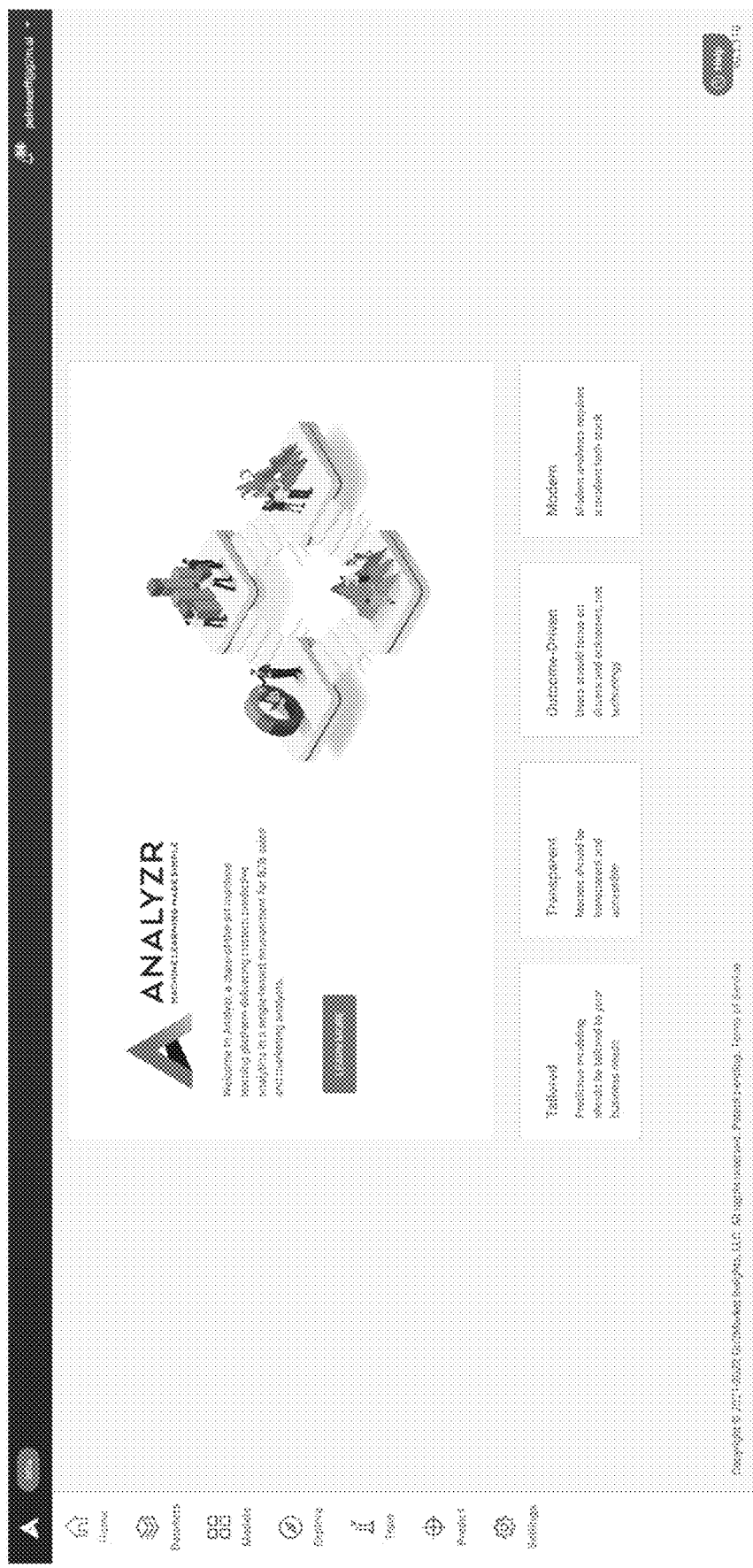
FIG. 8 illustrates one user interface according to embodiments of the present disclosure.
Figure 9:
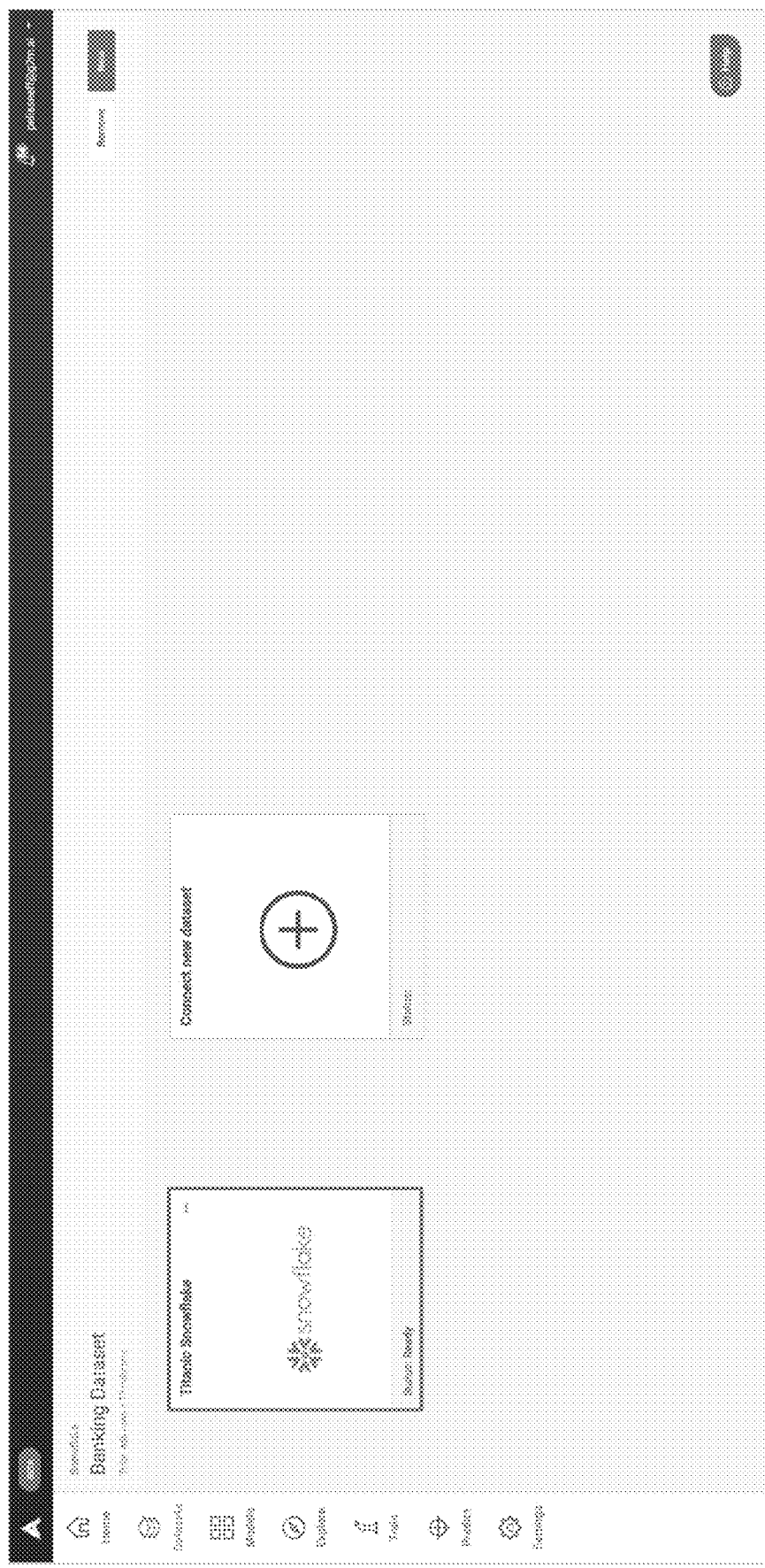
FIG. 9 illustrates another user interface according to embodiments of the present disclosure.
Figure 10:
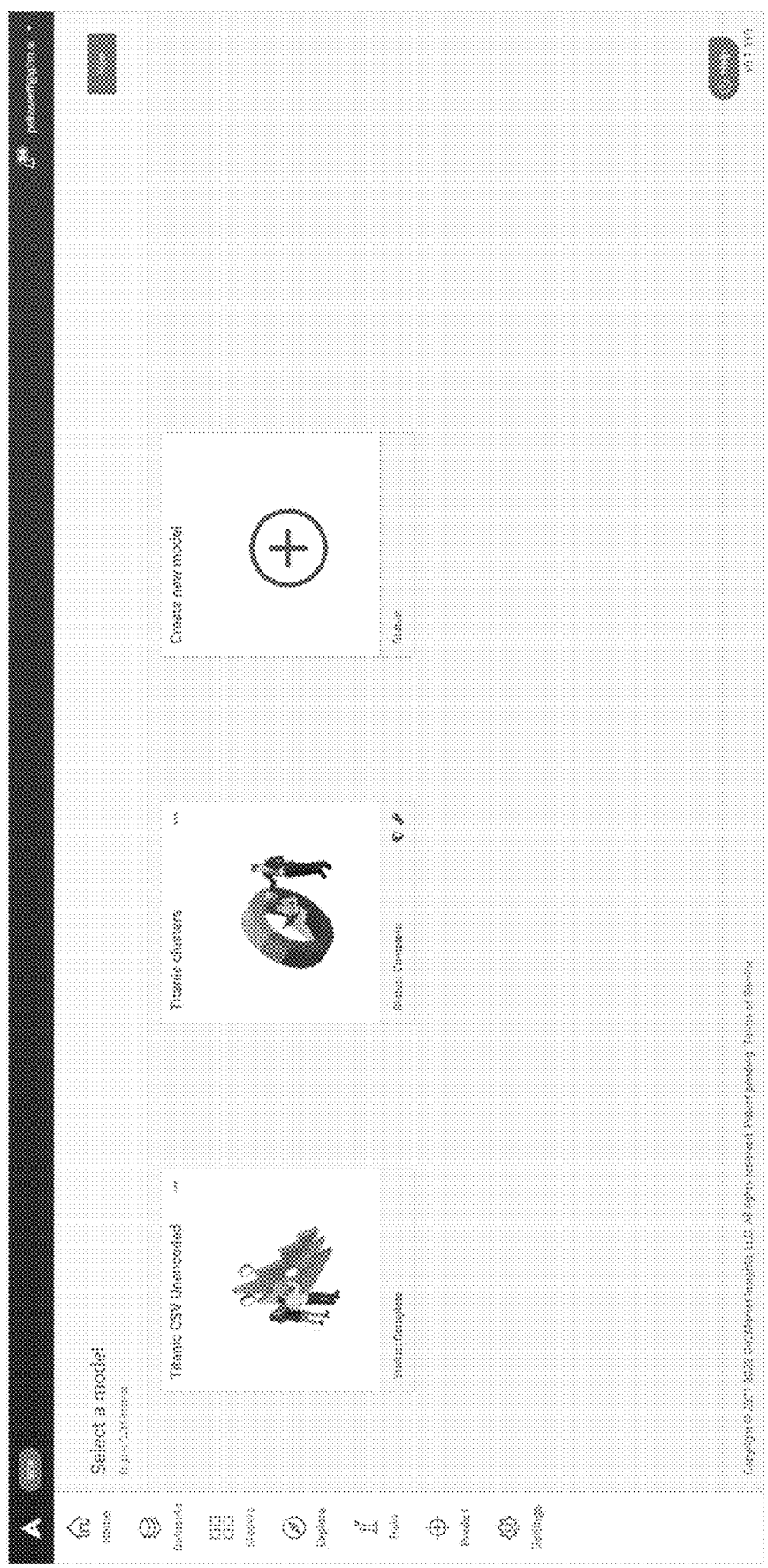
FIG. 10 illustrates yet another user interface according to embodiments of the present disclosure.
Figure 11:
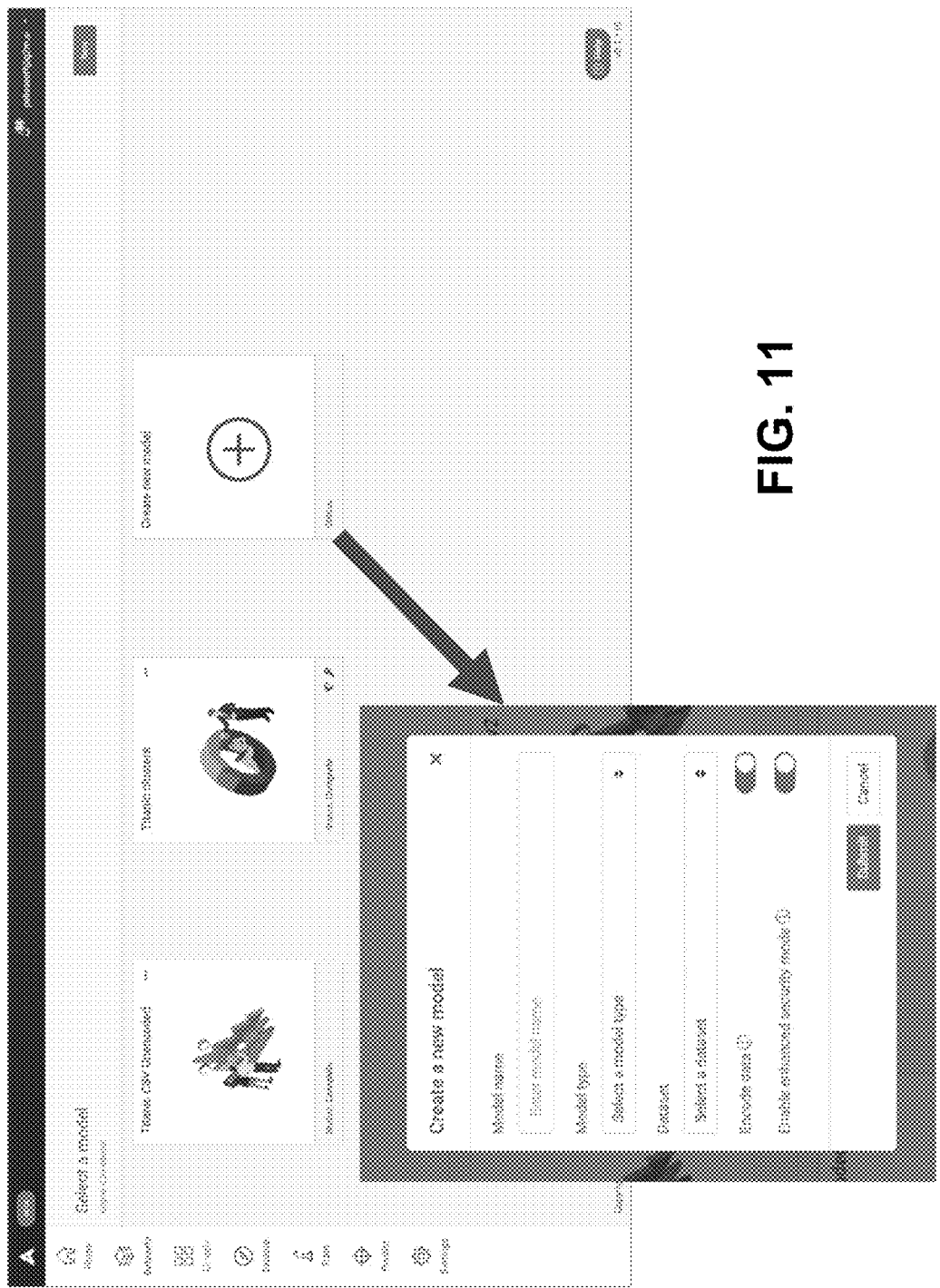
FIG. 11 illustrates yet another user interface according to embodiments of the present disclosure.
Figure 12:
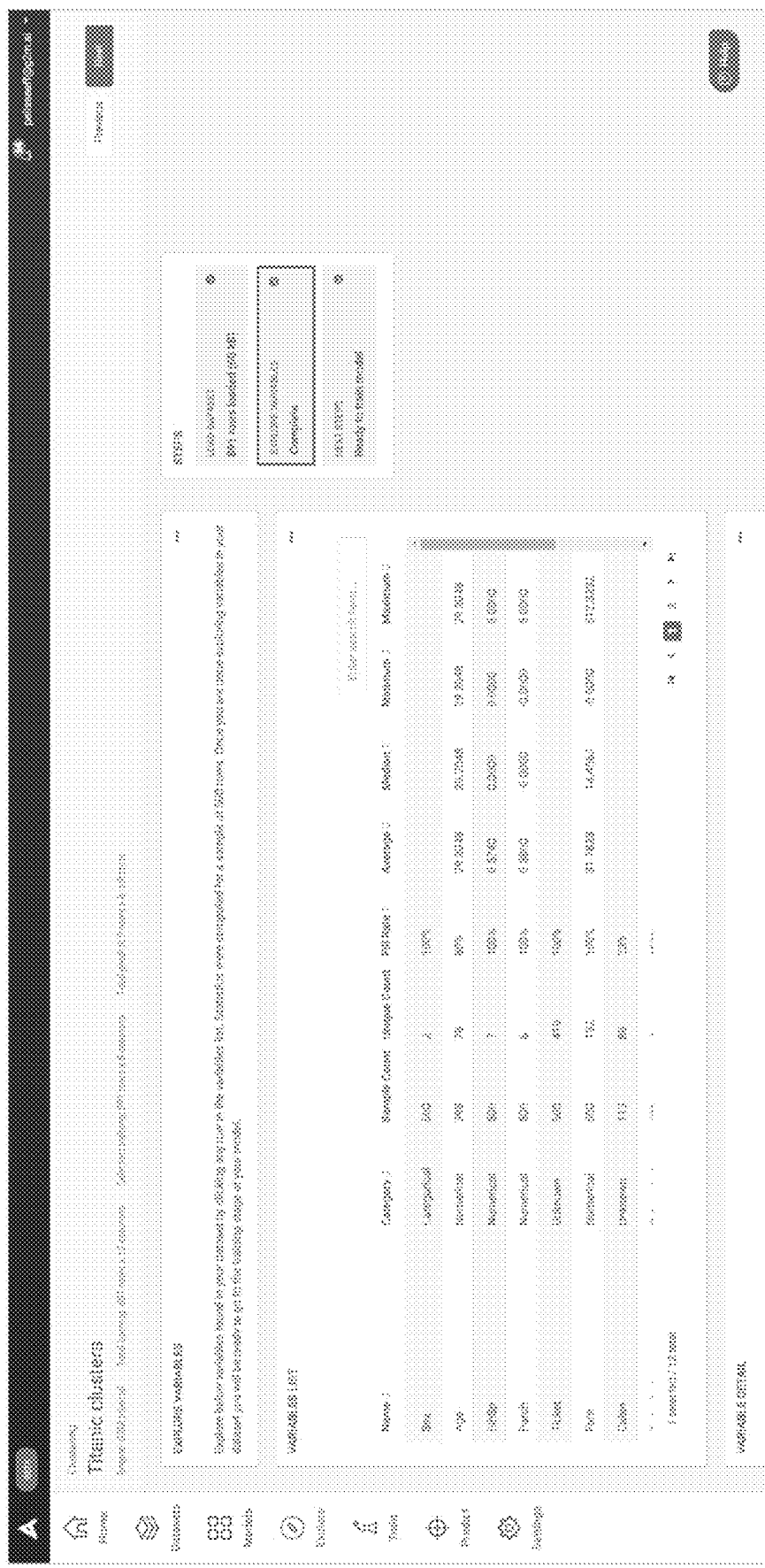
FIG. 12 illustrates yet another user interface according to embodiments of the present disclosure.
Figure 13:
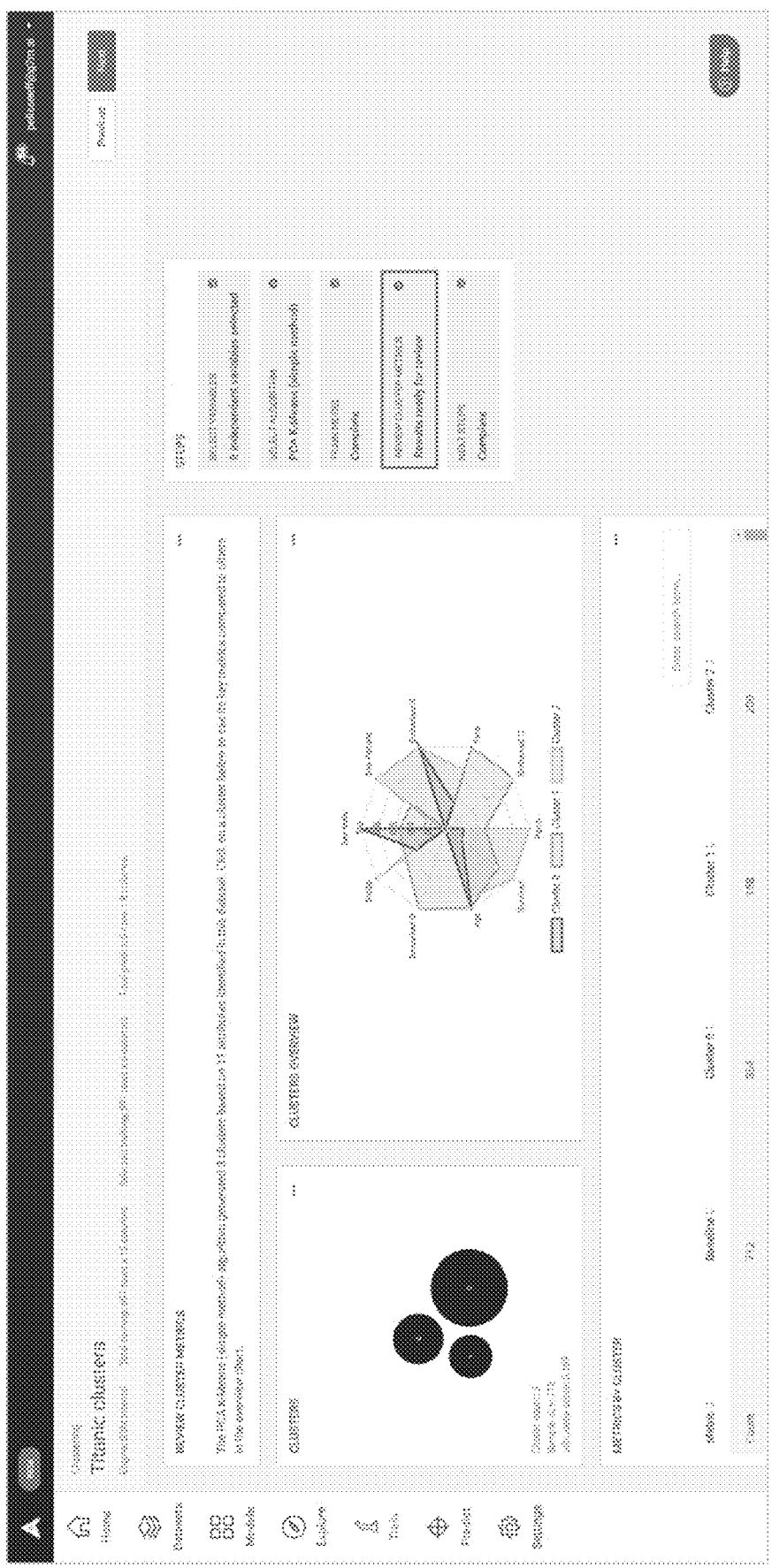
FIG. 13 illustrates yet another user interface according to embodiments of the present disclosure.
Figure 14:
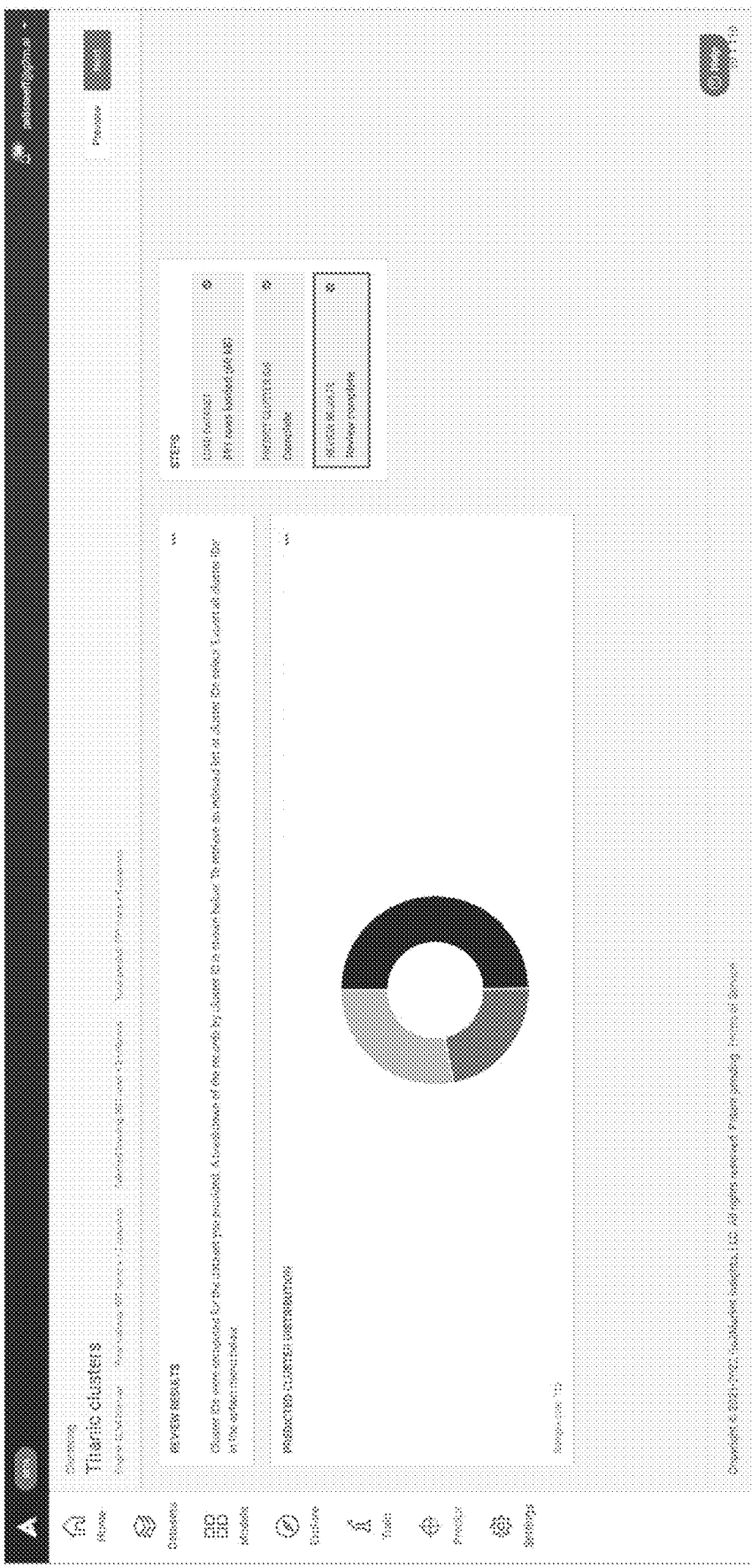
FIG. 14 illustrates yet another user interface according to embodiments of the present disclosure.

In preferred embodiments, and as illustrated in FIG. 7, the system permits a user to input data for the purpose of determining a propensity score or rating as will be described in detail below. The Analyzer engine 200 extracts and processes data received from the data warehouse. The transmission is routed through the forward ETL service 130, as is the data received from the CRM 110 and any third-party data sources 120. The data warehouse may receive the processed data and transmit via the reverse ETL service 140, as shown in FIG. 7, on a periodic basis. Although the anticipated frequency of such extraction and transmission events is shown in FIG. 7 (i.e., 15 min, 1 h) it is to be expressly understood that greater or lesser frequency is contemplated herein. From the processing of data, one or more propensity scores or models may be provided to the customer network described above in relation to FIG. 6, and in turn accessed by the customer's CRM 110 and/or marketing automation module 440. Additional propensity scores/models may be generated by the customer, with the data encoded on the client-side to prevent transmission of PII.

Referring to FIGS. 8-14, the system may comprise multiple user interfaces that facilitate use and manipulation of devices coupled to the system, as well as the use of machine learning aspects of the disclosure described above. In prior art systems, most machine learning user interfaces are designed for a data scientist. In contrast, the present system interface is designed for a business analyst (i.e., a user who understands quantitative analysis but may not know machine learning or is not adept at coding machine learning or propensity modeling systems). As shown in the interfaces shown in FIGS. 8-14, the user's steps are laid out clearly both in the navigation bar and in a "steps" panel, such that a business analyst may easily follow the process of building a machine learning model as it happens.

Figure 15:
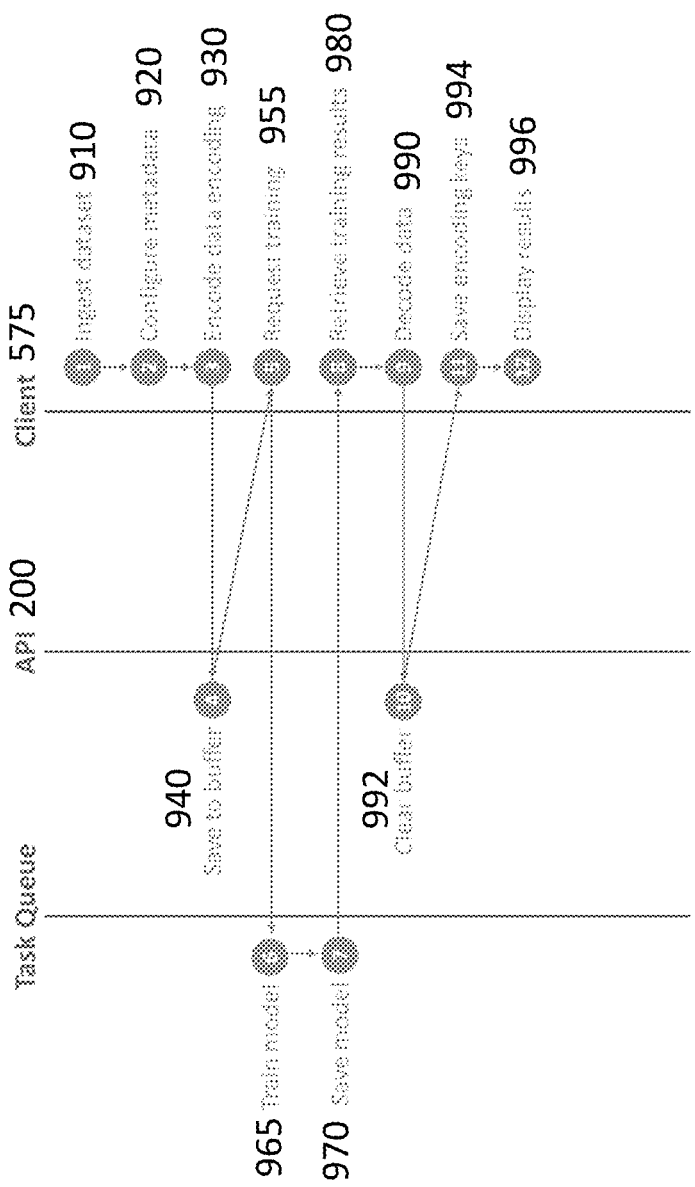
FIG. 15 illustrates a method of encoding and decoding data according to a particular embodiment.

Referring now to FIG. 15, various steps are illustrated for understanding the method of encoding and decoding data to prevent malicious or unwanted loss of PII or other sensitive data. First, it is necessary to emphasize that the present system provides a novel and effective method of providing client-side encoding of information/data received by the system. This client-side encoding preferably occurs exclusively on the software client—not on the server side—and solves problems experienced by those familiar with the prior art. In operation, the system systematically encodes all categorical and numerical variables on the client side, consistently stripping 100% of the sensitive information, regardless of user input. Keys required to encode/decode this data are kept exclusively on the client side, such that PII and other sensitive data is never transmitted to or stored on the server side. The PII and other sensitive data may only reside on the user's machine (i.e., the software client) and may be encrypted locally at rest. In this manner, PII may not be stolen through remote impersonation or hacking into the server. Indeed, the only way to maliciously acquire the keys using the present system is by taking control of the individual's specific physical machine. The sensitive information may stay there, within a more readily defined and specific security boundary, and thereby be restricted from crossing the security boundary when interfacing with other systems, including third-party systems. The system may be safely utilized, for example, to perform or share business analytics, propensity models and other customer-driven analysis without ever transmitting sensitive data.

Returning to FIG. 15, the steps of encoding/decoding preferably consist of ingesting a dataset 910, configuring associated metadata 920, encoding the data 930, saving to buffer 940, requesting training 955, training a model 965, saving the model 970, retrieving training results 980, decoding the data 990, clearing the buffer 992, saving the encoding keys 994 and displaying the results 996. As shown in FIG. 15, specific steps may occur via the client network, the API or the task queue.

Referring now to FIG. 16, two tables are shown to illustrate the manner in which encoded data appears after it has been encoded using the method described above. As described previously, any categorical and/or numerical variables received from the client or associated databases are encoded, as shown in the right-hand column, thereby removing the sensitive information. In this illustration, both the field name and field value are replaced with the encoded information. As the keys for decoding reside only on the client side, this information cannot be decoded without an act of actual theft (i.e., stealing a client's laptop). The data remains encoded throughout the analysis and processing steps described above, and decoded only once the data is secure.

Figure 17:
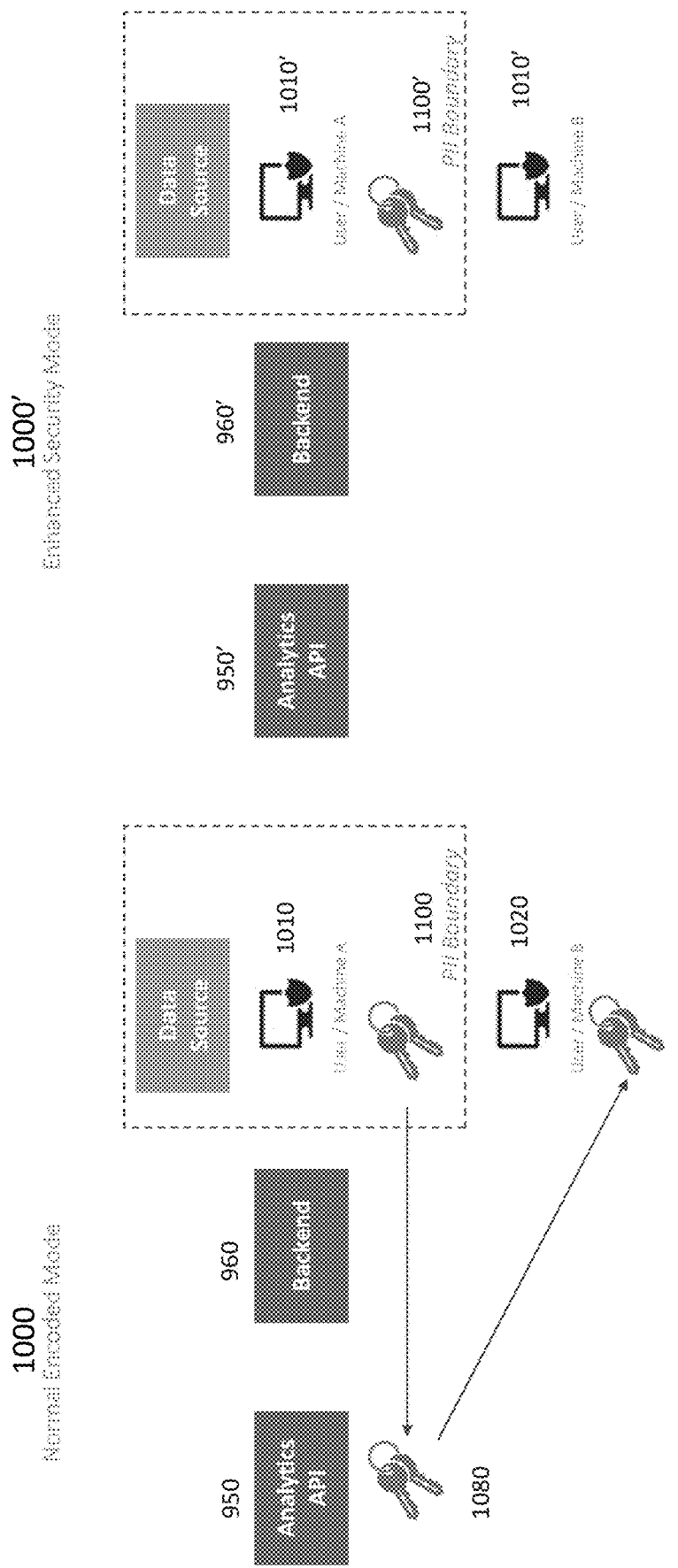
FIG. 17 illustrates aspects of an enhanced security mode of operation according to a particular embodiment.

Lastly, FIG. 17 illustrates two different modes of operation of the system according to embodiments described herein, including a normal security mode and an enhanced security mode. In a normal security mode, security keys 1080 required to encode/decode data transmitted by the system are passed beyond the client-side boundary. For instance, a user operating Machine A 1010 may utilize security keys 1080 to encode data within the PII boundary 1100 (i.e., on the client side), but under the normal security mode the keys may be passed to the Analyze engine 200 or another API 950 outside of the boundary 1100, as shown in the lefthand column of FIG. 17. Alternatively, the keys may be passed to another third-party service or system, or to a backend application 960 residing outside the boundary 100. The keys may be transmitted again to a different user operating Machine B 1020, who also resides outside the boundary 1100.

Although the data may be encoded and decoded using the methods described herein, the PII is not contained solely on the client-side and therefore is not as secure as the preferred embodiment shown on the righthand column of FIG. 17, which is the enhanced security mode. In this mode, the keys 1080' remain within the PII boundary 1100' and are not transmitted to the third-party API 950' or other backend applications 960' as shown in FIG. 17. Any user operating Machine B 1020' is allowed to receive the data but cannot decode the data, as they do not have the security keys 1080' to complete the decoding process. The user operating Machine B 1020' must therefore transmit their analysis to the user of Machine A 1010' before the PII data may be decoded. In certain embodiments, the system permits a user, such as an administrative user, to require or compel the use of an enhanced security mode (i.e., the client-side encoding method) to restrict all PII use. In this embodiment, no PII or other sensitive data is transmitted.

Specific details were given in this Detailed Description to provide a thorough understanding of the preferred embodiments. However, it will be understood by one of ordinary skill in the art that the embodiments may be practiced without these specific details. For example, components may be shown generally in block diagrams without certain elements in a particular figure in order not to obscure the embodiments in unnecessary detail. In other instances, well-known devices, processes, algorithms, structures, and techniques may be shown without unnecessary detail in order to avoid detracting from the principles under discussion in this disclosure.

Also, it is noted that the embodiments were described as a process, which is depicted as a flowchart, a flow diagram, a data flow diagram, a structure diagram, or a block diagram.

Although a flowchart may describe or otherwise number the operations as a sequential process, many of the operations can be performed in parallel or concurrently. In addition, the order of the operations may be re-arranged. It is to be expressly understood that a process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of transmitting, encoding and decoding data for use by at least one software client, the method comprising the steps of:
   receiving a set of data;
   identifying metadata associated with the data;
   reconfiguring the associated metadata;
   retrieving at least one pair of encoding keys;
   encoding the data;
   saving the data to a buffer;
   retrieving at least one pair of decoding keys;
   decoding the data;
   saving the at least one pair of decoding keys; and
   displaying the results;
   wherein the steps of encoding the data and decoding the data occurs exclusively on the at least one software client;
   wherein the set of data contains business analytics, propensity models and other customer-driven analysis;
   wherein the set of data is decoded to prevent personal identifying information (PII) from being viewable outside the software client; and
   wherein the foregoing steps are performed using a computational machine specifically configured to encode, decode and transmit the dataset.

2. The method of claim 1 further comprising the step of transmitting the set of data to a third party application.

3. The method of claim 2, wherein the at least one pair of encoding keys are retained by the at least one software client and not transmitted to third party.

4. The method of claim 3, wherein the third party may receive the set of data without the ability to decode the set of data.

5. The method of claim 4, further comprising the step of requesting the at least one pair of decoding keys from the at least one software client to decode the set of data.

6. The method of claim 5, wherein the step of requesting the at least one pair of decoding keys permits decoding of data.

7. The method of claim 6, wherein the step of requesting the at least one pair of decoding keys is made by an API, a third party service or a backend application.

8. The method of claim 2, wherein personal identifying information (PII) associated with the set of data is not transmitted to the third party application.

9. The method of claim 8, wherein the steps of encoding the data occurs locally on the software client while the software client is at rest.

10. The method of claim 1 further comprising the step of assigning an administrator.

11. The method of claim 5, further comprising the step of assigning an administrator to receive requests for the at least one pair of decoding keys from the at least one software client.

12. The method of claim 1, wherein the at least one set of decoding keys are saved locally at the software client and cannot be removed from the software client.

13. The method of claim 10, wherein the at least one set of decoding keys are saved locally at the software client and cannot be removed from the software client without approval from the administrator.

* * * * *